United States Patent Office 3,847,999
Patented Nov. 12, 1974

---

3,847,999
PREPARATION OF TRIARYL PHOSPHINES
John Nicholson Gardner, Garrison, N.Y., and Josef Kochling, Upper Montclair, N.J., assignors to Hoffmann-La Roche Inc., Nutley, N.J.
No Drawing. Filed Sept. 21, 1973, Ser. No. 399,597
Int. Cl. C07f 9/50
U.S. Cl. 260—606.5 P         9 Claims

ABSTRACT OF THE DISCLOSURE

A process for preparing tri(aryl or alkyl) substituted phosphines from tri(aryl or alkyl)phosphine oxides by reacting these phosphine oxides with a triaryl phosphite.

Background of the Invention

Phosphines such as tri(aryl or alkyl) substituted phosphines have proven to be extremely useful in Wittig reactions. During the course of the Wittig reactions, these phosphines are converted to phosphine oxides which have not been, up until now, commercially utilizable. The number of Wittig type reactions which have been utilized have created a problem with regard to the disposal of the phosphine oxides produced as waste products during this reaction. Furthermore, the phosphine starting materials are rather expensive reactanats. Therefore, the cost of the phosphine starting material coupled with the expense of disposing of the phosphine oxide waste product has proven extremely disadvantageous in the commercial utilization of the Wittig process. Workers in the field have been searching for a means of utilizing these phosphine oxides or for converting these phosphine oxides into useful products.

Summary of the Invention

In accordance with this invention, it has been discovered that by treating a phosphine oxide of the formula:

wherein $R_1$, $R_2$ and $R_3$ are independently selected from the group consisting of lower alkyl, cyclo lower alkyl, or aryl;

is reacted with a phosphite of the formula:

wherein $R_4$, $R_5$, and $R_6$ are aryl;

there is produced a phosphine of the formula:

wherein $R_1$, $R_2$ and $R_3$ are as above;

and a phosphate of the formula:

wherein $R_4$, $R_5$ and $R_6$ are as above.

Hence, the process of this invention provides a simple method for converting the phosphine oxide waste material into the triaryl phosphine starting material of the Wittig reaction. Furthermore, the phosphates of formula IV, produced in conjunction with the phosphines of formula III are known to be useful in various areas, for example, as plasticizers and fire-proofing agents. Therefore, the process of this invention provides a simple and economic means for converting waste products into commercially valuable materials.

Detailed Description of the Invention

The term "lower alkyl" as used throughout the instant specification, designates lower alkyl groups containing from 1 to 7 carbon atoms. Among the preferred lower alkyl groups are methyl, ethyl, propyl, isopropyl, n-hexyl, etc. The term "aryl" designates aromatic hydrocarbon radicals containing from 6 to 16 carbon atoms. These aryl radicals include phenyl, tolyl, xylyl and naphthyl. Among the preferred aryl radicals are the lower alkyl substituted aryl radicals such as tolyl. The term "cyclo lower alkyl" designates cyclo lower alkyl groups containing from 3 to 7 carbon atoms such as cyclopropyl, cyclohexyl, cyclopentyl and cycloheptyl.

The phosphines of formula III that are prepared in accordance with this invention are:

triethyl phosphine;
monoethyl diphenyl phosphine;
triphenyl phosphine;
diethyl monotolyl phosphine;
trixylyl phosphine; and
tritolyl phosphine.

Among the phosphates of formula IV that are produced in accordance with this invention are included:

triphenyl phosphate;
tritolyl phosphate; and
trixylyl phosphate.

The reaction of this invention can be carried out by simply mixing the compound of formula I and the compound of formula II together and heating this mixture to a temperature of from 150° C. to 450° C. Generally, it is preferred to carry out this reaction at a temperature of from about 300° C. to 400° C., with temperatures of from about 330° C. to 370° C. being especially preferred.

In carrying out this reaction, the temperature of from about 150° C. to 450° C. is maintained for a period of at least ½ hour. Generally, for best results, as far as yields and conversions are concerned, this reaction is carried out by maintaining the temperature of at least 150° C. for a period of from 1 hour to 4 hours. Generally, if desired, this reaction can be maintained at a temperature of at least 150° C. for a period of 10 hours or longer. However, since no additional benefits are achieved by utilizing long reaction times, there is no need to utilize these long reaction times. If desired, this reaction can be carried out at atmospheric pressure. On the other hand, if desired, this reaction can take place under pressure, i.e., up to 1,000 lbs. per square inch gauge.

The reaction of this invention can take place, if desired, in an inert organic solvent medium having a boiling point of above 150° C. However, since no beneficial results are achieved by utilizing such solvents, the reaction is generally carried out by simply adding the compound of formula I to the compound of formula II, or vice versa, to produce a reaction mixture. The compound of formula I and the compound of formula II need not be in pure form. It has been found that impurities in the compound of formula I and the compound of formula II need not adversely affect the reaction.

Generally, this reaction is carried out under an inert gas atmosphere. Any conventional inert gas can be utilized in carrying out this reaction. Among the preferred gases are nitrogen, argon, neon and helium.

In carrying out this reaction, the compound of formula I and the compound of formula II can be present in stoichiometric quantities, i.e., 1 mole of the compound of formula I per mole of the compound of the formula II. On the other hand, the reaction can be carried out with a molar excess of the compound of formula I or of the compound of formula II. In this reaction, one mole of the compound of formula II reacts with one mole of the compound of formula I to produce one mole of the compound of formula III and one mole of the compound of formula IV. However, excess amounts of the compound of formula I or the compound of formula II do not affect this reaction. The only disadvantage of utilizing large molar excesses of the compound of formula I or the compound of formula II is that the presence of unreacted compounds of either formula I or formula II in the reaction product, makes separation and isolation procedures cumbersome.

The compound of formula III can be easily separated from the compound of formula IV by any conventional means. Among the preferred means of separation is by crystallization of the compound of formula III from a lower alkanol solvent such as methanol. Any conventional method of crystallizing from a lower alkanol solvent can be utilized to recover the compound of formula III from the reaction medium.

The invention is further illustrated by the following examples. In these examples all temperatures are in degrees centigrade.

EXAMPLE 1

Triphenyl phosphine oxide (5.56 g., 0.02 mole) was added to triphenyl phosphite (6.24 g., 0.02 mole) and the mixture heated at reflux (about 365° C.) for two hours in an atmosphere of argon. After this interval, gas chromatography of the reaction product revealed the formation of triphenyl phosphine in 83% by weight yield based on a conversion of triphenyl phosphine oxide of 82% by weight. Diluting the reaction product with methanol (20 ml.) and cooling to −15° C. afforded triphenyl phosphine as a crystalline material (1.6 g.), m.p. 78–80° C. This product had an infra-red spectrum identical to that of an authentic sample of triphenyl phosphine.

EXAMPLE 2

Triphenyl phosphine oxide (2.23 g., 0.008 mole) was added to triphenyl phosphite (5.49 g., 0.18 mole). The resulting mixture was then heated at reflux (about 355° C.) for two hours in an atmosphere of argon. After this interval, gas chromatography of the reaction product revealed the formation of triphenyl phosphine in 100% yield based on a conversion of triphenyl phosphine oxide of 55%. Diluting the reaction product with methanol (5 ml.) and cooling to −15° C. afforded triphenyl phosphine as a crystalline material (0.4 g.), m.p. 77–79° C. The triphenyl phosphine had an infra-red spectrum identical to that of an authentic sample of triphenyl phosphine.

EXAMPLE 3

Triphenyl phosphine oxide (1.11 g., 0.004 mole) was added to triphenyl phosphite (6.20 g., 0.02 mole) and the mixture heated at reflux (about 353° C.) for four hours in an atmosphere of argon. After this interval, gas chromatography of the reaction product revealed the formation of triphenylphosphine in 100% yield based on a conversion of triphenyl phosphine oxide of 80%.

We claim:

1. A process for producing a phosphine of the formula:

wherein $R_1$, $R_2$ and $R_3$ are independently selected from the group consisting of lower alkyl, aryl or cyclo lower alkyl;

comprising reacting a phosphite of the formula:

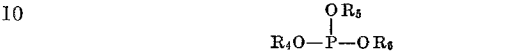

wherein $R_4$, $R_5$ and $R_6$ are independently aryl;

with a phosphine oxide of the formula:

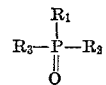

wherein $R_1$, $R_2$ and $R_3$ are as above;

at a temperature of at least 150° C. for a period of at least ½ hour.

2. The process of claim 1 wherein said temperature is from 150° C. to 450° C.

3. The process of claim 2 wherein said temperature is from 300° C. to 400° C.

4. The process of claim 2 wherein said reaction is maintained for a period of from 0.5 hours to 4.0 hours in an inert gas atmosphere.

5. A process for producing triphenyl phosphine comprising reacting triphenyl phosphine oxide with a phosphite of the formula:

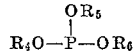

wherein $R_4$, $R_5$ and $R_6$ are independently aryl;

at a temperature of at least 150° C. for a period of at least ½ hour.

6. The process of claim 5 wherein $R_4$, $R_5$ and $R_6$ are aryl.

7. The process of claim 5 wherein said temperature is from 150° C. to 450° C.

8. The process of claim 7 wherein said temperature is from 300° C. to 400° C.

9. The process of claim 8 wherein said reaction is maintained for a period of from 0.5 hours to 4.0 hours in an inert gas atmosphere.

References Cited
UNITED STATES PATENTS

| | | | |
|---|---|---|---|
| 3,470,254 | 9/1969 | Hechenbleikner | 260—606.5 P |
| 3,499,039 | 3/1970 | Lorenz et al. | 260—606.5 P |
| 3,751,482 | 8/1973 | Weinberg | 260—606.5 P |
| 3,780,111 | 12/1973 | Young et al. | 260—606.5 P |

DANIEL E. WYMAN, Primary Examiner

A. P. DEMERS, Assistant Examiner

U.S. Cl. X.R.

260—966, 968, 985